US006565022B1

(12) United States Patent
Clements

(10) Patent No.: US 6,565,022 B1
(45) Date of Patent: May 20, 2003

(54) APPARATUS FOR AND METHOD OF RECYCLING CHOPPED STRAND MAT EDGE TRIM

(75) Inventor: Christopher James Clements, Guelph, CA (US)

(73) Assignee: Owens Corning Canada Inc., Scarborough (CA)

( * ) Notice: Subject to any disclaimer, the term of this patent is extended or adjusted under 35 U.S.C. 154(b) by 402 days.

(21) Appl. No.: 09/645,767

(22) Filed: Aug. 25, 2000

(51) Int. Cl.[7] ................................................ B02C 4/02
(52) U.S. Cl. ...................... 241/29; 241/159; 241/185.5; 241/227
(58) Field of Search ........................ 241/29, 24.1, 79.1, 241/159, 185.5, 227

(56) References Cited

U.S. PATENT DOCUMENTS

| | | |
|---|---|---|
| 2,719,336 A | 10/1955 | Stotler |
| 3,508,713 A | 4/1970 | Huppke |
| 3,519,211 A | 7/1970 | Sakulich et al. |
| 3,584,796 A | 6/1971 | Earle et al. |
| 4,161,897 A | 7/1979 | Nakazawa et al. |
| 4,355,438 A | 10/1982 | Reeves, Jr. et al. |
| 4,484,377 A | 11/1984 | Morel |
| 4,840,315 A * | 6/1989 | Rubin et al. ................ 241/24.1 |
| 4,953,795 A * | 9/1990 | Bielagus ..................... 241/159 |
| 5,169,571 A | 12/1992 | Buckley |
| 5,312,052 A | 5/1994 | Dellekamp |
| 5,352,258 A | 10/1994 | DeGreve et al. |
| 5,535,945 A | 7/1996 | Sferrazza et al. |
| 5,697,560 A | 12/1997 | Bennett |
| 5,772,126 A * | 6/1998 | Hanvey et al. ................ 241/19 |
| 5,795,517 A | 8/1998 | Heisler et al. |
| 5,879,802 A | 3/1999 | Beard et al. |

FOREIGN PATENT DOCUMENTS

| | | |
|---|---|---|
| EP | 0 566 830 | 10/1993 |
| EP | 0 633 110 | 1/1995 |

* cited by examiner

Primary Examiner—John M. Husar
(74) Attorney, Agent, or Firm—Inger H. Eckert; Stephen W. Banns; Maria C. Gasaway

(57) ABSTRACT

An apparatus for and method of recycling the edge portion of a chopped strand mat are disclosed. The method includes the steps of trimming an edge portion of the chopped strand mat, transporting the edge portion to a shredder assembly, and shredding the edge portion into individual strands or filaments. The separated strands are introduced with new chopped strands into the chopped strand mat forming process. The apparatus for recycling the edge portion of the mat includes a shredder assembly for separating the edge portion into individual strands. The shredder assembly includes two pairs of rollers that engage the trimmed edge portion. The first and second pairs of rollers are driven at first and second rotational speeds, respectively. Preferably, the second speed is greater than the first speed. The mat is pinched between each pair of rollers and is thereby placed under tension due to the different rotational speeds. The tension applied to the mat breaks the resin bond between the strands in the mat, separating the mat into individual strands on the downstream side of the second pair of rollers. The individual strands are then transported to a forming hood of the chopped strand mat forming apparatus and introduced into the chopped strand mat manufacturing process.

15 Claims, 5 Drawing Sheets

US 6,565,022 B1

APPARATUS FOR AND METHOD OF RECYCLING CHOPPED STRAND MAT EDGE TRIM

TECHNICAL FIELD AND INDUSTRIAL APPLICABILITY OF THE INVENTION

This invention relates to the recycling of a chopped strand mat, and in particular, to the recycling and shredding of an edge portion of a chopped strand mat. More particularly, this invention relates to an apparatus for and method of shredding an edge portion of a chopped strand mat so that the individual strands in the edge portion may be recycled in the chopped strand mat manufacturing process. The invention can be useful in the manufacture of chopped strand mats that may be used as reinforcement in plastic or composite products by eliminating a waste stream in the manufacturing process.

BACKGROUND OF THE INVENTION

Chopped strand mats, formed from glass fibers or other mineral strands, are commonly used as reinforcement in plastic or composite products. A chopped strand mat is typically made up of randomly oriented chopped glass fiber strands that are bonded together with a thermoplastic or thermoset resin. A chopped strand mat may be laminated or impregnated with resin and subsequently molded to form a variety of articles such as boat hulls and vehicle parts.

There are numerous ways to manufacture chopped strand mats. An example of a known chopped strand mat forming apparatus and method is disclosed in U.S. Pat. No. 2,719,336 to Stotler ("Stotler"), the disclosure of which is expressly incorporated herein by reference. Conventional manufacturing processes involve the formation of the mat and the takeup of the finished mat on a roller or reel.

Chopped strand mats are initially formed with a width greater than the desired finished width. The edges of the mat are then trimmed to remove the non-uniform edge portions and produce the desired finished width. The trimmed portions are typically discarded as unusable. This produces waste that must be disposed of and incurs cost in wasted raw materials.

An example of an apparatus for and method of reclaiming fiber reinforcement from a composite product is shown in U.S. Pat. No. 5,312,052 to Dellekamp ("Dellekamp"). Dellekamp discloses a fiber reclaimer that separates glass fibers from resin in a fiber reinforced plastic waste product. The plastic waste product is sheared and crushed in a roller mill to break the bond between the fiber reinforcement and the plastic resin.

As shown in FIG. 2 of Dellekamp, the roller mill 17 includes rollers 18 in pairs 20, 21, and 22. Each pair of rollers includes different sized serrations 28 to crush and separate the plastic waste product passing between them. Further, each pair of rollers is spaced apart to form a gap 19 between the respective roller surfaces for passage of the waste product therethrough. Each of the gaps 19 between the rollers is vertically aligned and decreases in size for each successive roller pair. Each roller pair 20–22 includes a pair of springs 24–26 that allows the rollers to move laterally away from one another to permit oversized material to pass through the gaps 19.

In Dellekamp, each of the rollers in a pair is driven at different speeds to produce an abrading action on the plastic waste product between them. The downstream rollers are driven at higher speeds than the upstream rollers to enable the volume of material that passed through a wider gap between upstream rollers to pass through the smaller gap between the downstream rollers.

Dellekamp's method and apparatus are not suitable for reclamation of edge trim from chopped strand mat.

SUMMARY OF THE INVENTION

The shortcomings of the prior art are overcome by the disclosed apparatus for and method of recycling the edge portion of a chopped strand mat. The method includes the steps of trimming an edge portion of the chopped strand mat, transporting the edge portion to a shredder assembly, and shredding the edge portion into individual strands or filaments. The separated strands are introduced with new chopped strands into the chopped strand mat forming process.

The apparatus for recycling the edge portion of the mat includes a shredder assembly for separating the edge portion into individual strands. The shredder assembly includes two pairs of rollers that engage the trimmed edge portion. The first and second pairs of rollers are driven at first and second rotational speeds, respectively. Preferably, the second speed is greater than the first speed. The mat is pinched between each pair of rollers and is thereby placed under tension due to the different rotational speeds. The tension applied to the mat breaks the resin bond between the strands in the mat, separating the mat into individual strands on the downstream side of the second pair of rollers. The individual strands are then transported to a forming hood of the chopped strand mat forming apparatus and introduced into the chopped strand mat manufacturing process.

DETAILED DESCRIPTION AND PREFERRED EMBODIMENTS OF THE INVENTION

An apparatus for recycling an edge portion of a chopped strand mat incorporating the principles of the invention is illustrated in FIGS. 1A–4. The disclosed chopped strand mat recycling apparatus improves the manufacturing process of chopped strand mats, particularly by recycling a trimmed edge portion of a formed mat and thereby eliminating a waste stream. The recycling apparatus transports the edge portion of the mat to a shredder apparatus to separate the mat into individual strands that are recycled into the chopped strand mat forming process.

Figure 1A:
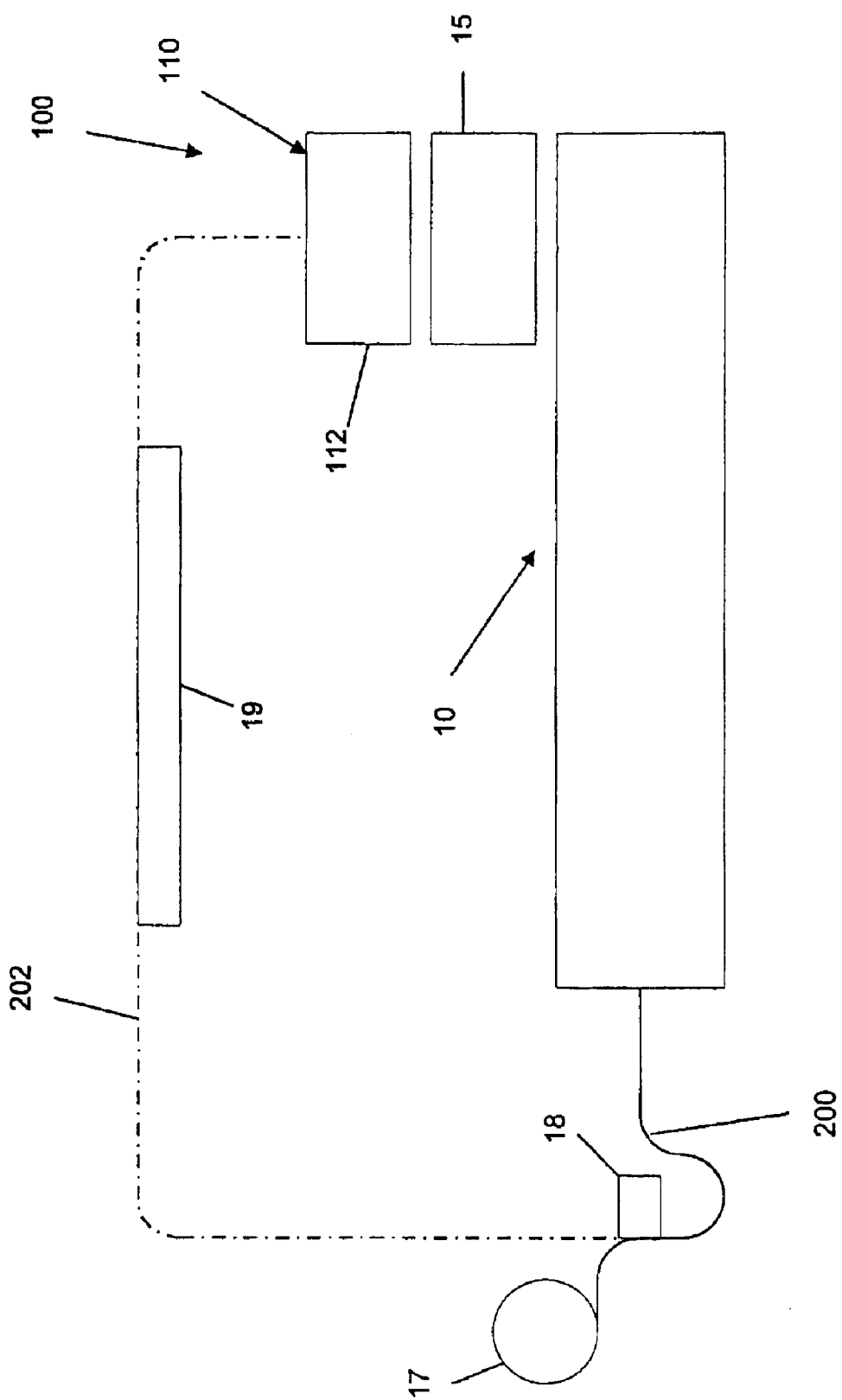
FIGS. 1A and 1B are schematic side and top views of a chopped strand mat forming and recycling system embodying the principles of the invention.
Figure 1B:
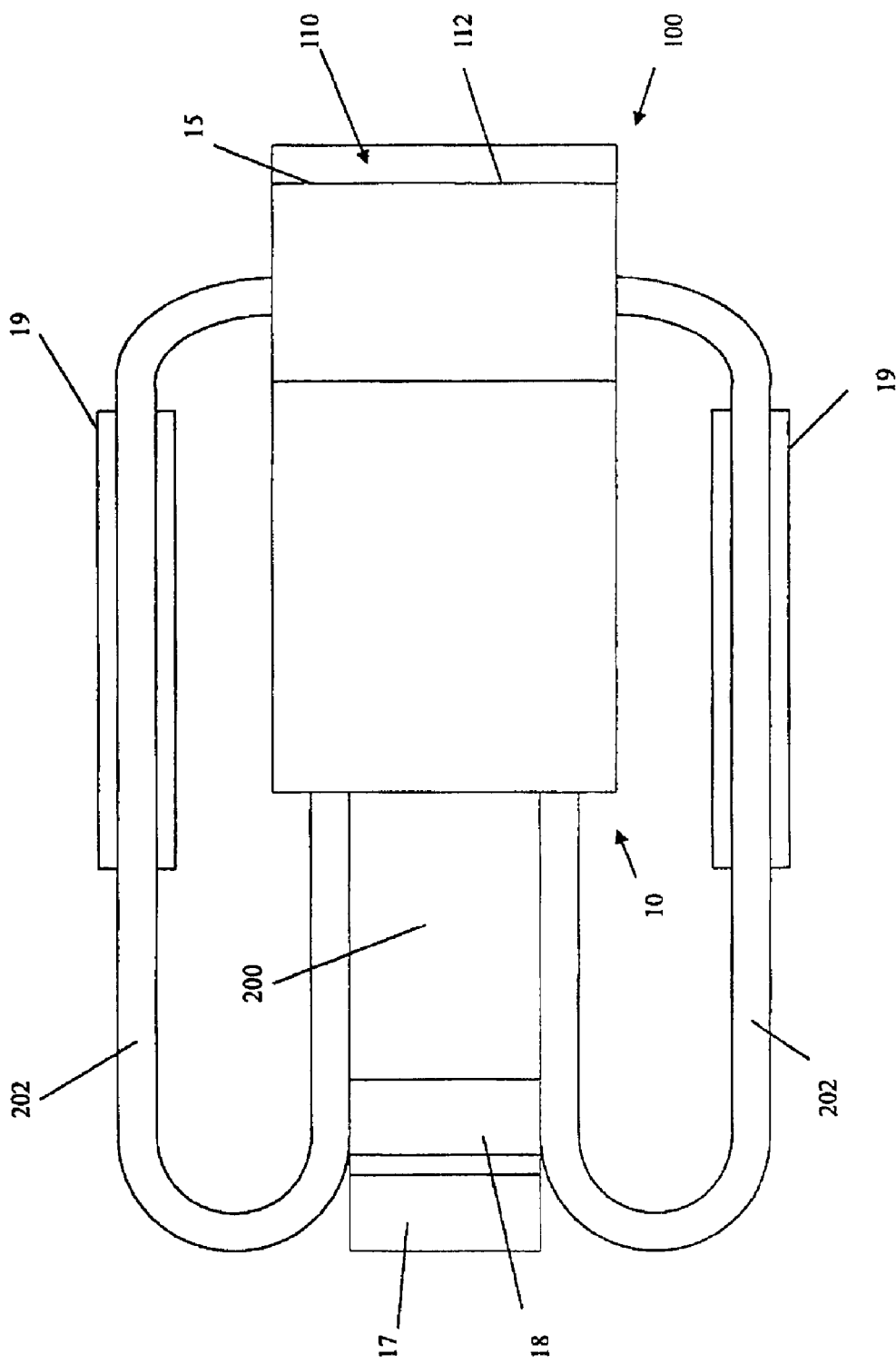

A conventional chopped strand mat forming apparatus 10 is shown in FIGS. 1A and 1B. Mat forming apparatus 10 includes a forming hood 15 into which chopped strands are supplied and a takeup roller 17 onto which the formed mat 200 is rolled. Mat forming apparatus 10 may be of any conventional design, such as that disclosed in Stotler.

As the chopped strand mat 200 exits the forming apparatus 10, an edge portion 202 of the mat 200 is trimmed by a mat trimming apparatus 18. The edge portion 202 is trimmed prior to rolling the mat 200 onto roller 17. The edge portion 202 is also referred to as "edge trim" which is defined as the material removed from the outside edges of a web of chopped strand mat.

A mat recycling apparatus 100 includes a shredder apparatus 110 having a shredder housing 112. The mat edge trim 202 may be transported from the trimming location to the shredder housing 112 by any known apparatus, such as a conveyor 19. The shredder apparatus 110 shreds the edge trim 202 into individual strands which are supplied to the forming hood 15 of the forming apparatus 10.

Figure 2:
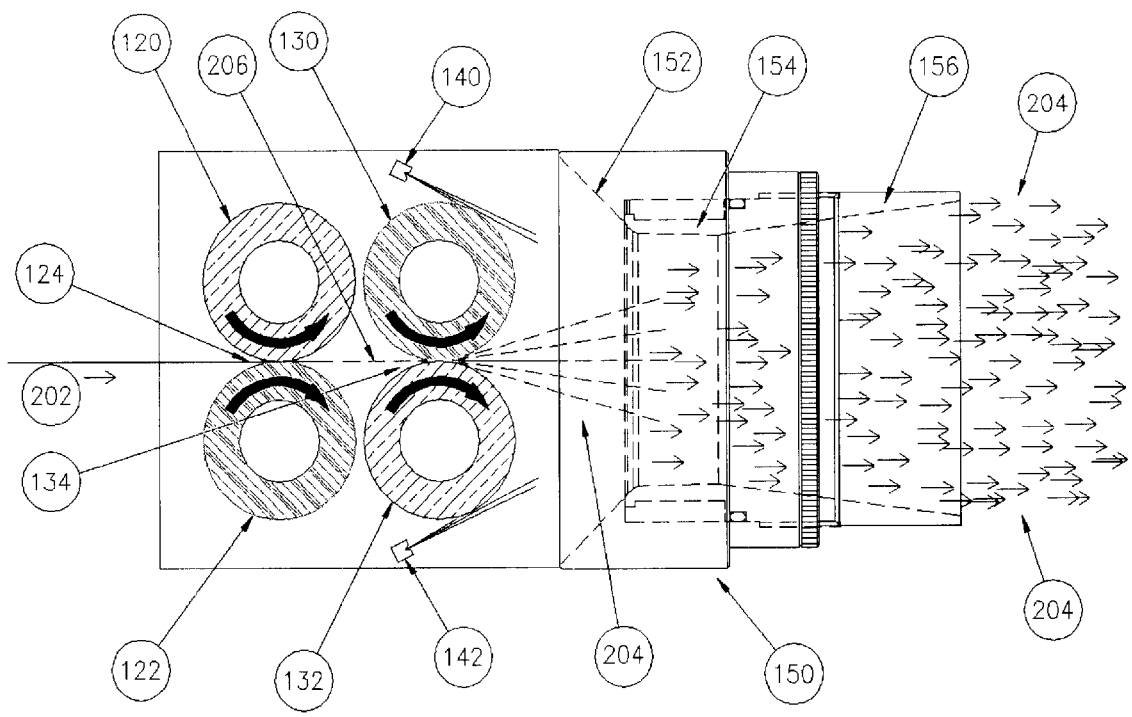
FIG. 2 is a schematic side view of the shredder apparatus embodying the principles of the invention.
Figure 4:
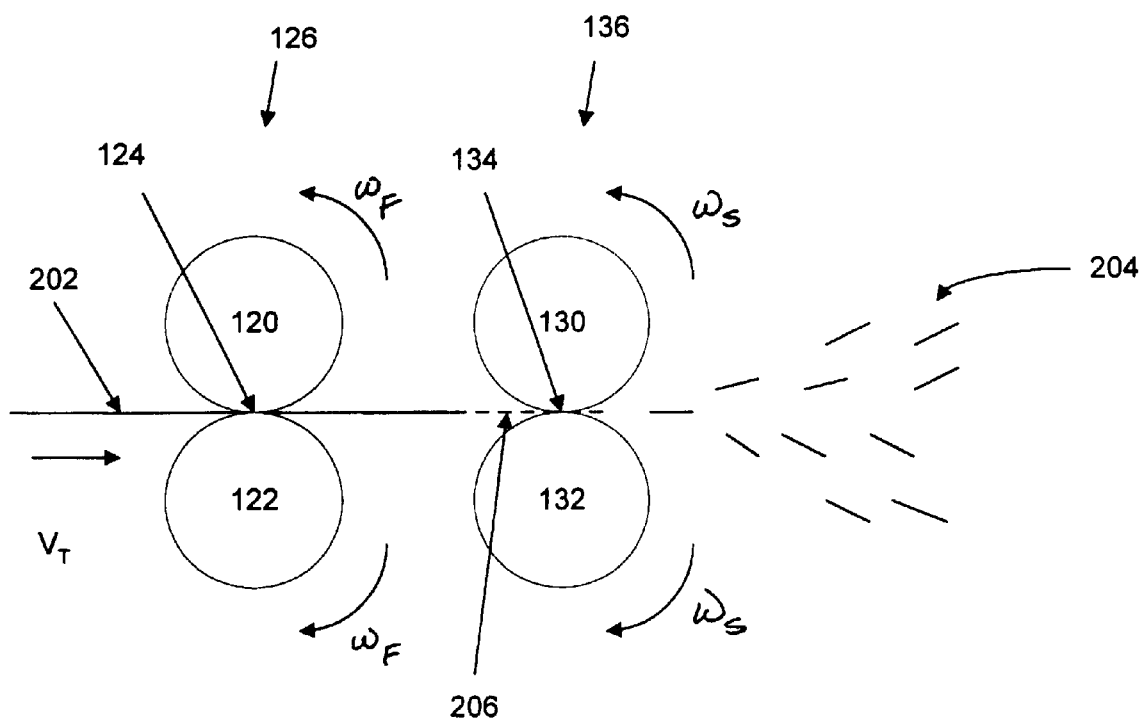
FIG. 4 is an exemplary view showing the relationship between the linear speed of the edge trim and the rotational speeds of the feeder and shredder rollers.

As shown in FIGS. 2 and 4, the shredder apparatus 110 includes two pairs of rollers rotatably mounted in the shredder housing 112. The first pair of rollers 120, 122 are referred to as feeder rollers and are located in a first engagement area 126. Feeder rollers 120, 122 are driven by a motor and coupled to each other by external gears (not shown).

The second pair of rollers 130, 132 are referred to as shredder rollers and are located in a second engagement area 136. Shredder rollers 130, 132 are driven by another motor and coupled to each other by external gears (not shown). The rollers are formed of metal, with one or both rollers in each pair (rollers 120 and 130) having a coating or layer of an elastomeric material to facilitate gripping the glass strands.

Figure 3:
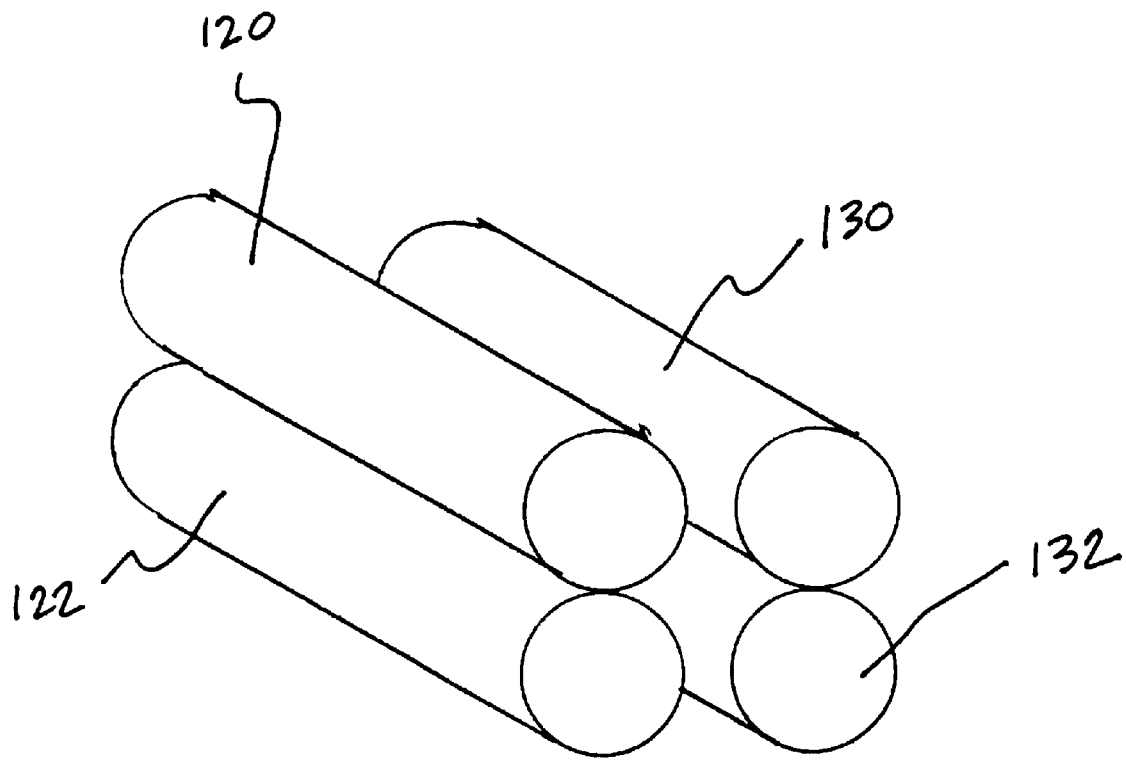
FIG. 3 is a perspective view of the feeder and shredder rollers shown in FIG. 2.

As shown in FIG. 3 (which is a perspective view of the relative positions of the rollers as they are mounted in the shredder housing 112) the longitudinal axes of the rollers in each pair are substantially parallel to each other. The distance between the longitudinal axes in a roller pair is slightly smaller than the sum of the radii of the rollers. The surface of the elastomer coated roller is therefore slightly compressed and a nip region is formed between the rollers. The elastomer coating provides a resilient surface to the roller.

Chopped glass fibers are dry and static electricity can build up during the separation of the mat edge trim. The separated strands 204 have a tendency to cling to the surfaces of the shredder rollers. Shredder apparatus 110 therefore preferably includes air nozzles 140, 142 disposed adjacent to shredder rollers 130, 132 to direct pressurized air against the surfaces of the rollers and dislodge the strands 204 attached to the rollers. Air nozzles 140, 142 direct compressed air tangentially along the surfaces of the shredder rollers 130, 132 to disrupt the boundary layer of air adjacent the surfaces of the rollers.

Each air nozzle 140, 142 is aimed at its corresponding shredder roller such that the major axis of the air fan that is discharged from said nozzles (not shown) is parallel to the roller axis and the air fan impacts the roller approximately tangentially to its surface, along the entire length of the roller. The velocity vector of the air fan is primarily opposite to the direction of the surface velocity of the roller at the point of air contact on the roller.

Shredder apparatus 110 includes a pneumatic air amplifier 150 coupled to the shredder housing 112. Any conventional air amplifier may be used, such as the air amplifier disclosed in U.S. Pat. No. 5,795,517 to Heisler et al., the disclosure of which is incorporated herein by reference. Air amplifier 150 includes an inlet portion 152, a throat 154, and an outlet portion 156. The outlet portion 156 is positioned adjacent the inlet of the forming hood 15 to facilitate the supply of the separated strands 204.

The operation of the mat recycling apparatus is now explained with reference to FIGS. 2 and 4. The edge trim 202 enters the shredder housing 112 and is conveyed to the first engagement area 126, where it is pinched between the feeder rollers 120, 122. As the feeder rollers 120, 122 rotate, they advance the edge trim 202 to the second engagement area 136. The leading ends of individual strands in the edge trim 202 are pinched between the shredder rollers 130, 132 and are accelerated up to the speed of the shredder rollers 130, 132.

Nip regions 124, 134, as shown in FIG. 2, securely grip the edge trim 202 and prevent any speed differentials between the feeder rollers and the edge trim and the shredder rollers and the strands. The rollers are preferably mounted to be in contact with each other and to have sufficient resiliency in the elastomeric coating to accommodate edge trim of varying thickness. The edge trim, regardless of the thickness, will be pinched between each set of rollers.

Shredder rollers 130, 132 rotate at a speed several times greater than the speed at which feeder rollers 120, 122 are driven by their motor. The speed differential puts the edge trim 202 under tension. The acceleration or sudden tensile force on the edge trim 202 breaks the bond of the thermoplastic or thermoset binding resin and separates the edge trim 202 into individual strands. Individual strands 204 begin to separate from the remainder of the edge trim 202 and pass through the shredder rollers in a separation zone 206 as shown in FIGS. 2 and 4. Once the strands 204 are through the shredder rollers, they are drawn into the air amplifier 150 and conveyed to the forming hood 15.

Any strands 204 that attach to a surface of a shredder roller are dislodged and blown toward the air amplifier 150 by compressed air from the nozzles 140, 142. The air amplifier 150 draws the separated strands and further accelerates the individual strands, increasing the distance between the strands, thereby decreasing the chance that a group of strands may come into contact with each other and form a clump of strands.

The separated strands 204 are ejected from the air amplifier 150 and shredder housing 112 and distributed within the forming hood 15, where they are deposited onto a forming belt with new chopped strands as part of the continuous process of manufacturing the chopped strand mat.

FIG. 4 shows the relationship between the linear speed of the edge trim and the rotational speeds of the feeder and shredder rollers. Initially, the linear speed of the edge trim 202 is designated as $V_T$, which is equivalent to the linear speed at which the mat 200 is formed. The feeder rollers rotate with a rotational speed designated as $\omega_F$, which produces a tangential speed in nip region 124 of between 1.0–1.25 times $V_T$. The shredder rollers rotate with a rotational speed designated as $\omega_S$, which is 5–15 times $\omega_F$. The speed differential between the feeder and shredder rolls to facilitate the shredding of the edge trim 202.

The structures of the shredder apparatus, with the exception of the rollers as discussed above, are preferably metal.

The following ranges of dimensions and speeds are provided for an exemplary apparatus and method embodying the principles of the invention:

width of edge trim=1.75–3.5 in. (4.45–8.90 cm.)

thickness of edge trim=0.02–0.12 in. (0.05–0.31 cm.)

area weight density of edge trim=0.5–4.0 oz/sq. ft. (0.015–0.122 gm/cm$^2$)

diameter of rollers=1.75–2.2 in. (4.45–5.59 cm.)

width of rollers=3–5 in. (7.62–12.7 cm.)

thickness of urethane on rollers=0.125–0.625 in. (0.32–1.59 cm.)

distance between the longitudinal axes of a roller pair= 1.65–2.15 in. (4.57–4.70 cm.)

distance between the planes formed by the axes of the roller pairs=1.95–2.5 in. (4.95–6.35 cm.)

linear speed of the edge trim=0.66–3.77 ft/sec. (20–115 cm/sec.)

As the artisan will appreciate, the ranges identified above may be adjusted to shred chopped strand mat edge trim of various thickness and widths.

The artisan will appreciate that there are many possible variations on the particular embodiment described above that would be consistent with the principles of the invention. For example, the edge trim may be continuously or intermittently shredded in the recycling process. If the rollers are intermittently driven, then the rotational speeds would have to be several times greater than the linear speed of the edge trim if the mat forming process is continuous.

I claim:

1. A method of separating mineral strands bound in a mat comprising the steps of:

engaging the mat between a first feeder roller and a second feeder roller disposed to pinch the mat between said first and second feeder rollers at a first engagement region and advancing the mat past the first engagement region at a first speed;

engaging the mat at a second engagement region and advancing the mat at a second speed greater than the first speed, thereby placing the mat under sufficient tension to separate the strands.

2. The method of claim 1, wherein said step of engaging the mat at a second engagement region comprises engaging the mat with a first shredder roller.

3. The method of claim 2, wherein said step of engaging the mat at a second engagement region further comprises engaging the mat with a second shredder roller disposed to pinch the mat between said first and second shredder rollers.

4. The method of claim 1, wherein said second speed is between five and fifteen times greater than the first speed.

5. A method of recycling mineral strands bound in a mat comprising the step of:

a) shredding the mat into individual strands by breaking the binding holding the strands together comprising the steps of:
        i) engaging the mat at a first engagement region between a first feeder roller and a second feeder roller disposed to pinch the mat between said first and second feeder rollers and advancing the mat past the first engagement region at a first speed; and
        ii) engaging the mat at a second engagement region and advancing the mat at a second speed greater than the first speed thereby placing the mat under sufficient tension to separate the strands: and b) introducing said individual strands into a feed apparatus for a chopped strand mat forming process.

6. The method of claim 5, further comprising the step of:

trimming an edge of the mat formed in the chopped strand mat forming process, and wherein said step of shredding the mat comprises shredding said trimmed edge of the mat.

7. The method of claim 5, wherein said step of shredding the mat comprises the steps of:

engaging the mat in a nip region formed between two rollers; and directing a flow of air toward a surface of at least one of said rollers to dislodge strands adhering to said surface.

8. An apparatus for separating mineral strands bound in a mat the apparatus comprising:

a fast feeder roller disposed to engage the mat at a first speed in a first engagement area; and a second feeder roller disposed adjacent said first feeder roller to define therebetween a nip region in which said mat is engaged by said first and second feeder rollers.

a first shredder roller disposed to engage the mat at a second speed in a second engagement area, said second speed being greater than said first speed, thereby placing the mat under sufficient tension to separate the strands and a second shredder roller disposed adjacent said first shredder roller to define therebetween a nip region in which said mat is engaged by said first and second shredder rollers.

9. The apparatus of claim 8, wherein at least one of said feeder rollers includes a resilient surface.

10. The apparatus of claim 8, wherein at least one of said shredder rollers includes a resilient surface.

11. The apparatus of claim 8, wherein the feeder rollers are driven at the same rotational speed.

12. The apparatus of claim 8, further comprising:

an air nozzle positioned adjacent to said shredder roller to direct compressed air toward the surface of said shredder roller to dislodge strands from said surface.

13. The apparatus of claim 8, further comprising:

a shredder housing in which the feeder and shredder rollers are mounted; and an air amplifier coupled to said shredder housing to draw the strands out of said shredder housing.

14. The apparatus of claim 13, further comprising:

a mat forming apparatus in which the mat can be formed from a supply of stands, said air amplifier being coupled to said supply of strands to deposit strands separated from said mat in said strand supply.

15. The apparatus of claim 14, further comprising:

a mat trimming apparatus in which edge portions are trimmed from the mat formed on said mat forming apparatus, and an edge trim conveying apparatus disposed to convey said edge trim from said mat trimming apparatus to said feeder rollers.

* * * * *

UNITED STATES PATENT AND TRADEMARK OFFICE
CERTIFICATE OF CORRECTION

PATENT NO.    : 6,565,022 B1                                           Page 1 of 1
DATED         : May 20, 2003
INVENTOR(S)   : Clements It is certified that error appears in the above-identified patent and that said Letters Patent is hereby corrected as shown below:

<u>Column 6,</u>
Line 12, "fast" should be -- first --
Line 13, take out the "and"
Line 46, "stands" should be -- strands --

Signed and Sealed this

Second Day of September, 2003

JAMES E. ROGAN
*Director of the United States Patent and Trademark Office*